United States Patent
Undy et al.

(10) Patent No.: US 6,629,167 B1
(45) Date of Patent: Sep. 30, 2003

(54) PIPELINE DECOUPLING BUFFER FOR HANDLING EARLY DATA AND LATE DATA

(75) Inventors: Stephen Undy, Fort Collins, CO (US); James E. McCormick, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/506,777

(22) Filed: Feb. 18, 2000

(51) Int. Cl.[7] .............................................. G06F 3/00
(52) U.S. Cl. .................... 710/52; 709/102; 712/218; 712/219
(58) Field of Search ...................... 710/52; 712/219, 712/1, 218; 709/102

(56) References Cited

U.S. PATENT DOCUMENTS

| | | | |
|---|---|---|---|
| 4,467,414 A | 8/1984 | Akagi et al. | 364/200 |
| 5,778,245 A | 7/1998 | Papworth et al. | 395/800.23 |
| 5,822,561 A | * 10/1998 | Nakajima | 712/1 |
| 5,859,999 A | 1/1999 | Morris et al. | 395/565 |
| 5,860,017 A | 1/1999 | Sharangpani et al. | 395/800.23 |
| 5,918,034 A | 6/1999 | Petolino, Jr. | 395/394 |
| 6,049,818 A | * 4/2000 | Leijten et al. | 709/102 |
| 6,163,839 A | * 12/2000 | Janik et al. | 712/218 |

FOREIGN PATENT DOCUMENTS

WO   WO99/13610   3/1999   ............ H04L/1/00

* cited by examiner

*Primary Examiner*—Jeffrey Gaffin
*Assistant Examiner*—Harold Kim

(57) ABSTRACT

An apparatus for and a method of decoupling at least two multi-stage pipelines are described. At least two paths of data through which data from the first pipeline is send to the second pipeline are provided. During a pipelined execution of a task in the at least two pipelines, the second pipeline may not require every data produced in the first pipeline to process at least some subset of the task. The first pipeline may not be able to produce all data required by each of the stages of the second pipeline. One of the two data paths provides an early data path for a type of data that becomes available in a stage of the first pipeline and that may be processed in a stage of the second pipeline early in time. The other of the two data paths provides a late data path for a type of data that becomes available in a stage of the first pipeline and that may be processed in a stage of the second pipeline later in time. Each data path may comprise a buffer, e.g., a FIFO.

21 Claims, 5 Drawing Sheets

|  | ─── Front-End ─── | | | ─── Back-End ─── | |  |
|---|---|---|---|---|---|---|
| Time | Stage A | Stage B | Stage C | Buffer | Stage D | Stage E |
| t | 0 | – | – | – |  |  |
| t+1 | 1 | 0 | – | – |  |  |
| t+2 | 2 | 1 | 0 | – |  |  |
| t+3 | 3 | 2 | 1 | – | 0 | – |
| t+4 | 4 | 3 | 2 | – | 1 | 0 |
| t+5 | 5 | 4 | 3 | – | 2 | 1 |
| t+6 | 6 | 5 | 4 | 3 | 2 | 1 |
| t+7 | 7 | 6 | 5 | 4,3 | 2 | 1 |
| t+8 | 8 | – | 6 | 5,4 | 3 | 2 |
| t+9 | 8 | – | – | 6,5 | 4 | 3 |
| t+10 | 8 | – | – | 6 | 5 | 4 |
| t+11 | 8 | 7 | – | – | 6 | 5 |
| t+12 | 9 | 8 | 7 | – | – | 6 |
| t+13 |  | 9 | 8 | – | 7 | – |
| t+14 |  |  | 9 | – | 8 | 7 |

PRIOR ART

*Fig. 2*

|  | ⎯Front-End⎯ | | | | ⎯Back-End⎯ | |
| --- | --- | --- | --- | --- | --- | --- |
| Time | Stage A | Stage B | Stage C | Early Buffer | Late Buffer | Stage D | Stage E |
| t | 0 | – | – | – | – | | |
| t+1 | 1 | 0 | – | – | – | | |
| t+2 | 2 | 1 | 0 | – | – | 0 | |
| t+3 | 3 | 2 | 1 | – | – | 1 | 0 |
| t+4 | 4 | 3 | 2 | – | – | 2 | 1 |
| t+5 | 5 | 4 | 3 | 3 | 2 | 2 | 1 |
| t+6 | 6 | 5 | 4 | 4,3 | 3,2 | 2 | 1 |
| t+7 | 7 | 6 | 5 | 5,4 | 4,3 | 3 | 2 |
| t+8 | 8 | – | 6 | 6,5 | 5,4 | 4 | 3 |
| t+9 | 8 | – | – | 6 | 6,5 | 5 | 4 |
| t+10 | 8 | – | – | – | 6 | 6 | 5 |
| t+11 | 8 | 7 | – | – | – | – | 6 |
| t+12 | 9 | 8 | 7 | – | – | 7 | – |
| t+13 | | 9 | 8 | – | – | 8 | 7 |
| t+14 | | | 9 | – | – | 9 | 8 |

Back-End Stall (t+5 to t+6)
Front-End Stall (t+8 to t+10)

*Fig. 4*

PIPELINE DECOUPLING BUFFER FOR HANDLING EARLY DATA AND LATE DATA

TECHNICAL FIELD

The invention relates to computers and microprocessors. More particularly, this invention relates to the method and apparatus for improving the performance of pipelined microprocessors.

BACKGROUND ART

Making computers run faster has been an eternal goal of the computer industry. Since its introduction in the early 1950's, the pipelining technique has proven to be more than a transient trend, and has taken a foot hold in modem computing as a major performance enhancement technique. Almost all microprocessors today employ some level of pipelining technique to maximize their speed performance.

The pipelining technique involves breaking down a task, e.g., execution of an instruction, processing of data or a performance of an arithmetic operation, etc., into a number of smaller sub-tasks. The task travels down a pipeline having a number of stages arranged in an assembly line fashion, each stage processing one of the sub-tasks. The task is completed when all of the sub-tasks are completed, i.e., when the sub-tasks have processed through every stage of the pipeline. For example, if a pipeline comprises N stages, a task would take N clocks to complete, i.e., N sub-tasks must be completed.

A key feature of the pipelining technique is that a new task can be fed into the pipeline on every clock cycle. For instance, a while the first task has moved on to the second stage of the pipeline, a second task can be fed into the pipeline to occupy the first stage of the pipeline. Thus, ideally, after the first N clock cycles, the pipeline should be completely filled, i.e., hold N tasks. Under this ideal circumstances, a completion of a task can be observed on every clock cycle. Thus, a significant performance enhancement may be realized from pipelined execution of instructions.

Some computer systems employ multiple pipelines arranged in a serial manner as, e.g., shown in FIG. 1, which shows a first pipeline 101—commonly referred to as the front-end pipeline—, and a second pipeline 102— commonly referred to as the back-end pipeline. The first pipeline 101 may comprise, e.g., stages A, B and C. The second pipeline 102 may comprise, e.g., stages D, E and F.

In this arrangement, a task is completed when it has traveled through each of the stages, A, B, C, D, E and F, i.e., it has to travel through both pipelines 101 and 102. The decoupling buffer 103 provides a decoupling between the two pipelines 101 and 102 so that a stall condition in one pipeline does not affect the other pipeline.

For example, when the second pipeline becomes "stalled", i.e., cannot receive data output by the first pipeline 101, the data output from the last stage of the first pipeline 101, i.e., from stage C, is temporarily stored in the decoupling buffer 103, and fed therefrom to the initial stage, i.e., stage D, of the second pipeline 102 when it once again becomes available to receive the data. When the first pipeline 101 is stalled, i.e., produces no data for the second pipeline 102, the second pipeline 102 receives data from the decoupling buffer 103. Thus, the buffer 103 may provide each of the first pipeline 101 and the second pipeline 102 an immunity from the effects of any stall conditions in the one another, and thus increase overall throughput.

An example of the above described operation of a conventional pipeline including the decoupling buffer is shown in FIG. 2, which shows data objects 0–9 progressing through the various stages of the pipelines. In particular, FIG. 2 shows a back-end pipeline stall condition during clock cycles t+5 through t+7. During the back-end pipeline stall, no progression of data objects were made, i.e., in each of the stages D and E, the data remained as data object 2 and data object 1, respectively. During the clock cycles, t+6 and t+7, the data objects 3 and 4 have retired from the front-end pipeline, and could not be accepted by the back-end pipeline, and are thus stored in the decoupling buffer 103.

A front-end pipeline stall condition is illustrated during clock cycles t+8 through t+10. It can be seen that no data objects are exiting the front-end pipeline, yet the data objects in the back-end pipeline continues their progression uninterrupted by receiving the data objects, e.g., data objects 4 and 5, from the decoupling buffer 103.

Decoupling buffers are designed to have a variable size, and can be made not to effect the performances of the pipelines when the buffer is empty, i.e., by providing a direct (un-buffered) path between the pipelines, e.g., between stages C and D. For example, in FIG. 2, the decoupling buffer 103 is shown to haves a variable size with a ranging from empty, e.g., during clock cycles t through t+5, to a size sufficient to hold two data objects, e.g., during clock cycles t+7 to t+9.

Unfortunately, while the use of a pipeline decoupling buffer has provided a significant improvement in the overall throughput of a pipelined system, the conventional decoupling buffer described above still suffers from significant drawbacks.

In particular, a particular data object may be made available in an earlier stage of the first pipeline 101, e.g., in stage B. The same data object may be processed by a stage in the second pipeline 102, e.g., by stage D. However, the same data object must travel through other stages of the first pipeline, e.g., the stages B and C, to reach the stage D of the second pipeline 102. That is, stage D ends up waiting for the data object despite the fact that it is ready to process the same. This type of data object that is operable by a stage of the second pipeline before the data object reaches the last stage of the first pipeline are hereinafter referred to as an early data. When an early data is forced to flow through the last stage of the first pipeline in order to reach the second pipeline, the pipeline system is not running at the optimum performance.

On the other hand, there may be a data object that does become available when other data objects are ready to be retired from the first pipelined 101, i.e., available for the second pipeline 102 for processing. This type of data object is referred to herein as "late data". That is, the term late data is defined herein as a data object that becomes available in the first pipeline later in time than when at least one other data from the first pipeline is available.

For example, in a typical pipelined system, the first pipeline 101 comprises a front-end pipeline that is responsible for fetching the instructions. The second pipeline 102 comprises a back-end pipeline that executes the instructions fetched by the front-end pipeline 101.

While the initial stages, e.g., the stage D, of the back-end pipeline 102 may be ready to receive the instruction that is already fetched and available in a stage of the first pipeline, e.g., stage B, some other information associated with the instruction may not be available at the time the instruction reached stage B, and would only become available when the instruction finally reaches the stage C. In this situation, stage C is being provided solely to accommodate the late data, i.e., to add delay so that the instruction does not retire from the front-end pipeline before the late data is available.

For example, the instruction portion of a branch instruction may be fetched and available at stage B. The instruction can be operated upon by the second pipeline at the first stage of execution. However, the branch target of the branch instruction may not be calculated and thus is not available when the instruction is ready at the output of stage B. Thus, stage C is added as a padding to prevent the instruction from entering the back-end pipeline 102. Moreover, the branch target may not be required during the earlier stages of the execution, e.g., in stage D, and may only be required at a later stage, e.g., at stage E.

Because stage C is fixed in place in the first pipeline 101, all instructions (whether or not the instruction uses late data) must go through the extra stage. This reduces overall performance of the system.

Thus, what is needed is efficient multiple pipelines. Also what is needed is efficient decoupling methods and apparati. What is needed are methods and apparatus which do not require an indiscriminate application of delay in order to accommodate late data.

SUMMARY OF INVENTION

A method of providing a decoupling between pipelines is described. More particularly, a method of providing a decoupling between at least a first pipeline and a second pipeline comprises providing a first buffer area adapted to receive an early data from the first pipeline, the second pipeline being adapted to receive said early data from the first buffer area, and providing a second buffer area adapted to receive a late data from the first pipeline, the second pipeline being adapted to receive the late data from the second buffer area.

In addition, an apparatus for providing a decoupling between at least a first pipeline and a second pipeline comprises a first buffer area adapted to receive an early data from the first pipeline, the second pipeline being adapted to receive said early data from the first buffer area, and a second buffer area adapted to receive a late data from the first pipeline, the second pipeline being adapted to receive the late data from the second buffer area.

Moreover, multiple multi-stage pipelines comprise a first pipeline having at least a first stage and a second stage, the first stage preceding the second stage, a second pipeline having at least a third stage and a fourth stage, the third stage preceding the fourth stage, a first buffer area operably disposed between the first stage and the third stage, and a second buffer operably disposed between the second stage and the fourth stage.

DESCRIPTION OF DRAWINGS

Features and advantages of the present invention will become apparent to those skilled in the art from the following description with reference to the drawings, in which:

FIG. 2 is a table showing a progression of instructions through the conventional multiple multi-stage pipelines shown in FIG. 1.

FIG. 4 is a table showing a progression of instructions through the multiple multi-stage pipelines.

DETAILED DESCRIPTION OF PREFERRED EMBODIMENTS

For simplicity and illustrative purposes, the principles of the present invention are described by referring mainly to an exemplar embodiment thereof, particularly with references to an example of pipelines each having three stages. However, one of ordinary skill in the art would readily recognize that the same principles are equally applicable to, and can be implemented with, pipelines having any number of stages, and that any such variation do not depart from the true spirit and scope of the present invention.

In preferred embodiments there are at least two data paths through which data from a first pipeline is sent to a second pipeline. During a pipelined execution of a task in the two pipelines, the second pipeline may not require every data produced in the first pipeline in order to process at least some subset of a task. The first pipeline may not be able to produce all the data required by each of the stages of the second pipeline. Accordingly, one of the two data paths provides a data path for early data while the other data path provides a data path for late data.

Figure 1:
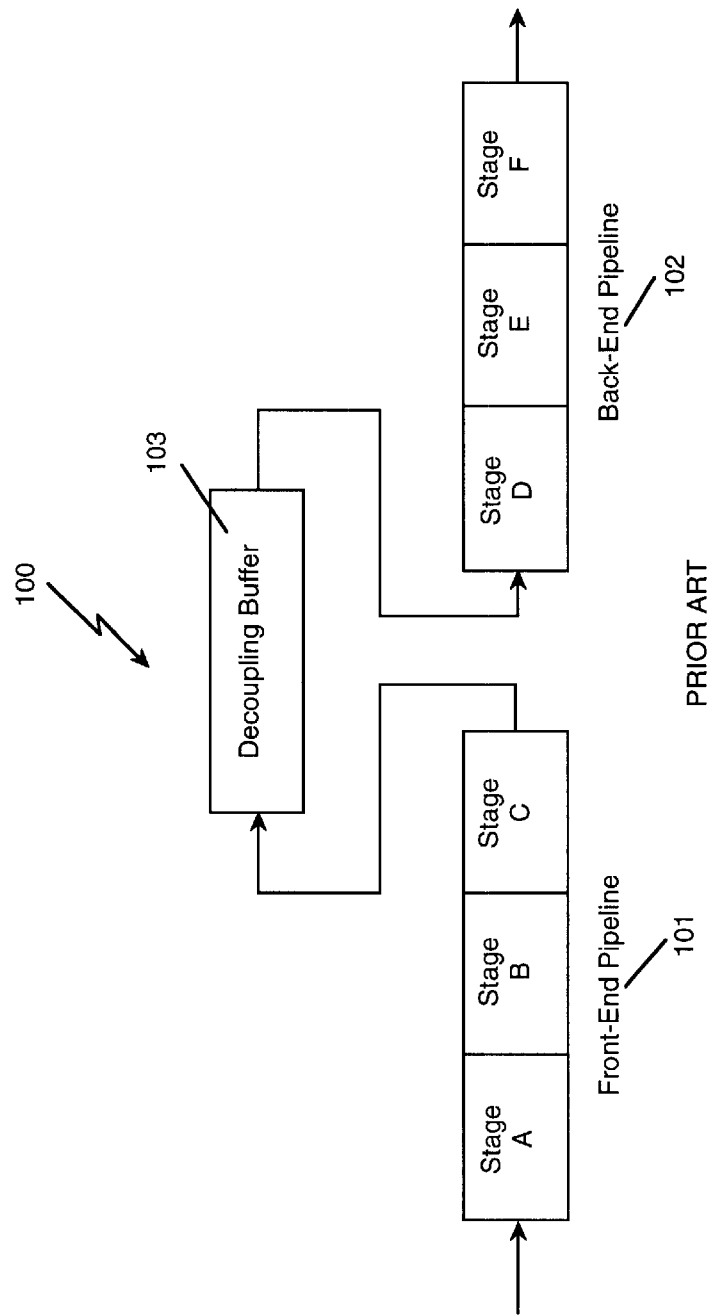
FIG. 1 is a block diagram showing conventional multiple multi-stage pipelines including a decoupling buffer.
Figure 3:
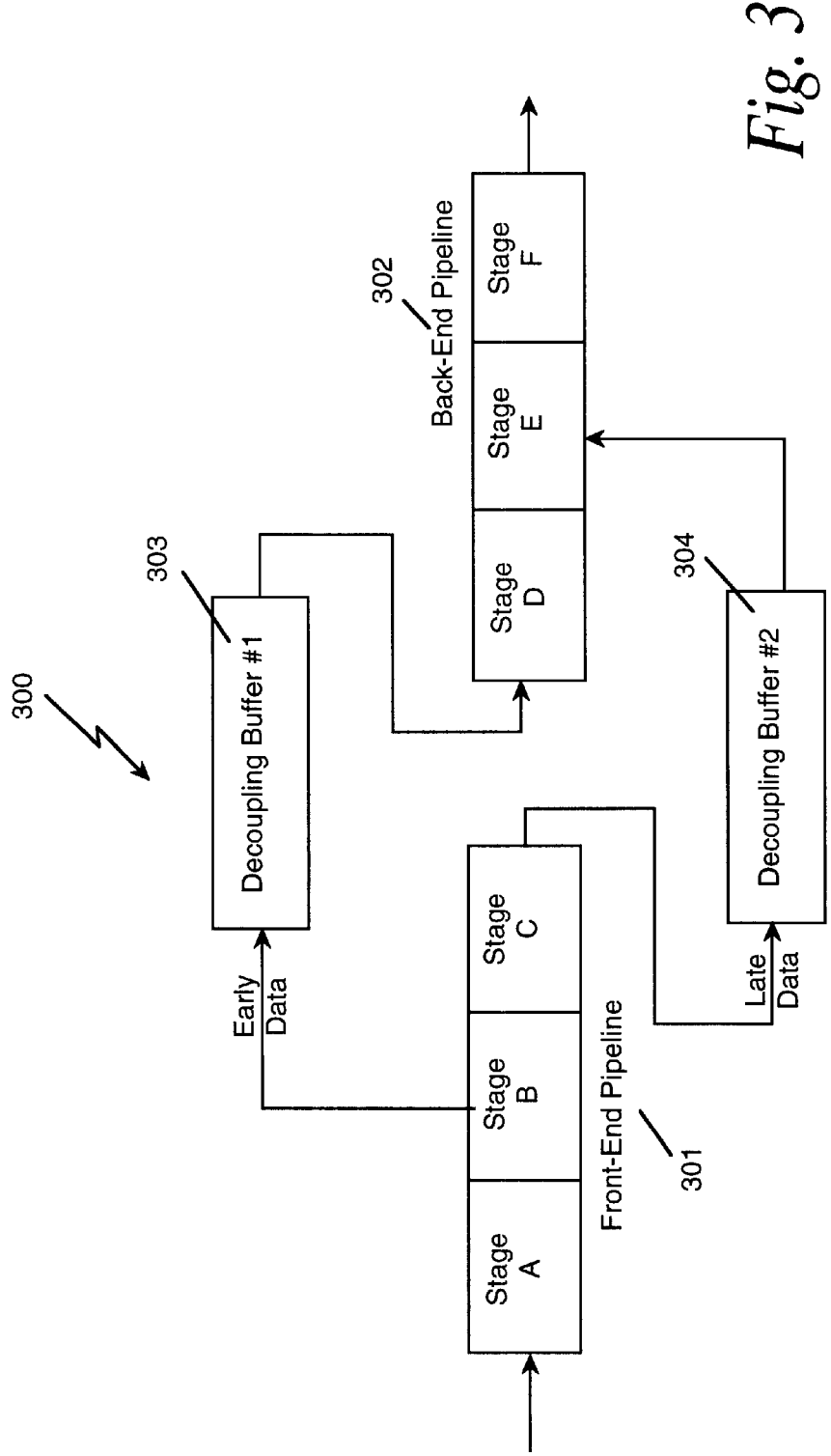
FIG. 3 is a block diagram showing an exemplary embodiment of multiple multi-stage pipeline including a early data decoupling buffer and a late data decoupling buffer.

In particular, FIG. 3 show an exemplary embodiment of the multiple pipeline system 300, which comprises a first pipeline 301, a second pipeline 302, a first decoupling buffer 303 and a second decoupling buffer 304. By way of example, both pipelines 301 and 302 are shown to have three stages, it should be readily apparent to one of ordinary skill that the pipelines may have any number of stages.

Each decoupling buffer may be a FIFO, either as a physically separate device, or may be in a different area of the same physical device. The decoupling buffer #1 303 provides a data path for early data between stages, e.g., stages B and D, of the first pipeline 301 and the second pipeline 302. The decoupling buffer #1 303 provides a data path for early data between stages, e.g., stages B and D, of the first pipeline 310 and the second pipeline 302. Although in this example, stages B and D are shown to be connected to the input and output of the decoupling buffer 303, respectively, it should be readily apparent to one of ordinary skill that the input to the decoupling buffer 303 may be any stage having available therein early data, and the output of the buffer 303 may be connected to any stage that may be able to operate on the early data.

When early data becomes available, e.g., in stage B, rather than forcing the early data to flow through additional stages, e.g., the stage C, the early data is fed to the decoupling buffer #1 303. The early data is then supplied to a stage of the second pipeline 302, e.g., the stage D, when the stage becomes ready to receive the early data.

For example, the operation of one pipeline is illustrated in FIG. 4, which shows data objects 0–9 progressing through the various stages of the pipelines. In particular, FIG. 4 shows a back-end pipeline stall condition during clock cycles t+5 through t+6, and a front-end stall condition during clock cycles t+8 through t+10. The early buffer 303 and the late buffer 304 collectively provide the decoupling of the pipelines.

In addition, it can be seen that the data object 0 has made it to stage D of the back-end pipeline at time t+2, which is, e.g., a clock cycle earlier than the conventional pipeline as shown in FIG. 2. Thus, it can be seen that the early data did not have to be delayed needlessly by being forced to flow through extra stages.

The decoupling buffer #2 304 provides a data path for late data between stages, e.g., stages C and E, of the first pipeline 301 and the second pipeline 302. The decoupling buffer #1 304 provides a data path for late data between stages, e.g., stages C and E, of the first pipeline 301 and the second pipeline 302. Although in this example, stages C and E are shown to be connected to the input and output of the decoupling buffer 304, respectively, it should be readily apparent to one of ordinary skill that the input to the decoupling buffer 304 may be from any stage having available therein late data and, the output of the buffer 304 may be connected to any stage that may be able to operate on the late data. The decoupling buffer 304, when not empty, must be larger than the FIG. 2 decoupling buffer 203 by at least the size of a stage of the first pipeline, i.e., stage A, B or C, etc.

When late data becomes available, e.g., in stage C, rather than forcing it to enter the initial stage, e.g., stage D, of the second pipeline 302, the early data is allowed to enter the second pipeline 302 through another stage, e.g., stage E, which operates on the late data.

Thus, it can be seen that the second pipeline 302 was not required to sit idle and wait for the arrival of the late data, and was instead supplied the appropriate data in a just-in-time manner.

Moreover, it can be seen that for those tasks that do not have associated late data, one or more stages, e.g., the stage C, of the first pipeline are effectively bypassed, and thus the overall performance improved.

Figure 5:
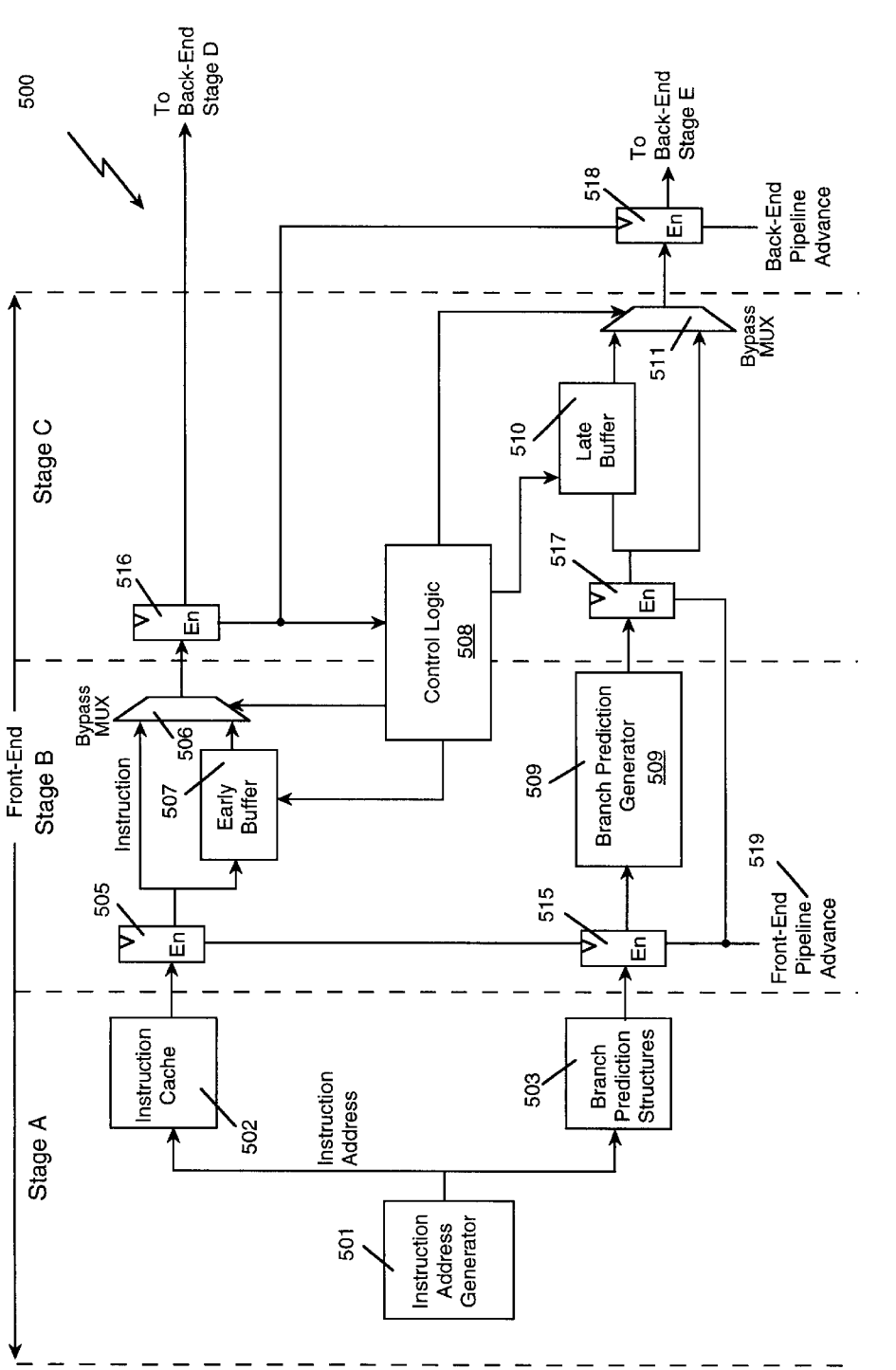
FIG. 5 is a block diagram showing the relevant portions of the front-end pipeline of the exemplary multiple multi-stage pipeline.

FIG. 5 shows the relevant portions of a preferred implementation of the front-end pipeline 301 in more detail. By way of example, and not as a limitation, the front-end pipeline 500 is shown as an instruction pipeline, e.g., a the pipeline responsible for fetching instructions and feed the same to the back-end pipeline that executes the instructions, having three stages, A, B and C. In particular, for example, during stage A, the instruction address generator 501 generates the pointer to the instruction to be fetched, and the instruction is fetched into the instruction cache. The instruction becomes available for further processing by the back-end pipeline in stage B when the instruction is latched into the latch 505 in response to the front-end pipeline advance signal 519. Thus, the instruction is an early data as previously defined herein. When the early data buffer 507 is empty, the instruction from the latch 505 is sent to stage D of the back-end pipeline through the bypass multiplexer 506 and to another latch 516. The control logic 508 monitors both the front-end pipeline and the back-end pipeline for any stall condition, and sends control signals to the early buffer 507, the bypass multiplexers 506 and 511, and the late buffer 510.

When the early data buffer 507 has data stored therein, or a determination is made that the back-end pipeline has stalled, the instruction from the latch 505 is stored in the early data buffer 507. When the back-end pipeline is stalled, the back-end pipeline advance signal 520 does not switch, and thus no data from the early data buffer 507 is transmitted to the back-end pipeline.

If the instruction fetched in stage A is a branch instruction, the branch prediction structure 503 and the branch prediction generator 509 collectively determine the predicted branch target. The branch target thus does not become available for processing by the back-end pipeline until stage C when it is output by the latch 517. Thus, the branch target is a late data as previously defined herein.

When the late data buffer 510 is empty, the branch target from latch 517 is sent to stage E of the back-end pipeline through the bypass multiplexer 511 and the latch 518. When the late data buffer 510 has data stored therein, or a determination is made that the back-end pipeline has stalled, the branch target from the latch 517 is stored in the late data buffer 510. When the back-end pipeline is stalled, the back-end pipeline advance signal 520 does not switch, and thus no data from the late data buffer 510 is transmitted to the back-end pipeline.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of providing a decoupling between a first pipeline and a second pipeline, comprising:
   providing a first buffer adapted to receive early data from said first pipeline, said second pipeline being adapted to receive said early data from said first buffer; and
   providing a second buffer adapted to receive late data from said first pipeline, said second pipeline being adapted to receive said late data from said second buffer; wherein
   said first buffer receives said early data from a stage of said first pipeline, said stage preceding another stage of said first pipeline from which said second buffer area receives said late data.

2. The method of providing a decoupling in accordance with claim 1, wherein:
   said first buffer and said second buffer are located within a single physical memory device.

3. The method of providing a decoupling in accordance with claim 1, further comprising:
   reducing capacity of at least one of said first buffer and said second buffer to zero.

4. The method of providing a decoupling in accordance with claim 1, wherein:
   said early data is input to a stage of said second pipeline, said stage preceding another stage of said second pipeline to which said late data is input.

5. The method of providing a decoupling in accordance with claim 1, wherein:
   said late data comprises a branch target address.

6. An apparatus for providing a decoupling between a first pipeline and a second pipeline, comprising:
   a first buffer adapted to receive early data from said first pipeline, said second pipeline being adapted to receive said early data from said first buffer; and
   a second buffer adapted to receive a late data from said first pipeline, said second pipeline being adapted to receive said late data from said second buffer; wherein
   an input of said first buffer is operably connected to a stage of said first pipeline, said stage preceding another stage of said first pipeline to which an input of said second buffer is operably connected.

7. The apparatus for providing a decoupling in accordance with claim 6, wherein:
   said first buffer and said second buffer are located within a single physical memory device.

8. The apparatus for providing a decoupling in accordance with claim 6, wherein:

each of said first buffer and said second buffer has a variable size.

9. The apparatus for providing a decoupling in accordance with claim 6, wherein:

an output of said first buffer is operably connected to a stage of said second pipeline, said stage preceding another stage of said second pipeline to which an output of said second buffer is operably connected.

10. The apparatus for providing a decoupling in accordance with claim 6, wherein:

said first pipeline comprises a front-end instruction pipeline;

wherein said second pipeline comprises a back-end instruction pipeline; and wherein said late data comprises a branch target address of an instruction.

11. The apparatus for providing a decoupling in accordance with claim 6, wherein:

one of said first buffer and said second buffer is a first-in-first-out (FIFO) device.

12. Multiple multi-stage pipelines, comprising:

a first pipeline having at least a first stage and a second stage, said first stage preceding said second stage;

a second pipeline having at least a third stage and a fourth stage, said third stage preceding said fourth stage;

a first buffer operably disposed between said first stage and said third stage, wherein said first buffer is adapted to provide a data path for early data; and a second buffer operably disposed between said second stage and said fourth stage, wherein said second buffer is adapted to provide a data path for late data.

13. The multiple multi-stage pipelines according to claim 12, wherein:

said first buffer and said second buffer are located within a single physical memory device.

14. The multiple multi-stage pipelines according to claim 12, wherein:

each of said first buffer area and said second buffer area has a variable size.

15. The multiple multi-stage pipelines according to claim 12, wherein:

said first pipeline comprises a front-end instruction pipeline;

wherein said second pipeline comprises a back-end instruction pipeline; and wherein said late data comprises a branch target address of an instruction.

16. The multiple multi-stage pipelines according to claim 12, wherein:

one of said first buffer and said second buffer is a first-in-first-out (FIFO) device.

17. An apparatus providing a decoupling between a first pipeline and a second pipeline, comprising:

a first buffer means for receiving early data from said first pipeline, said second pipeline being adapted to receive said early data from said first buffer means; and a second buffer means for receiving late data from said first pipeline, said second pipeline being adapted to receive said late data from said second buffer means; wherein said first buffer means receives said early data from a stage of said first pipeline, said stage preceding another stage of said first pipeline from which said second buffer means receives said late data.

18. The apparatus providing a decoupling in accordance with claim 17, wherein:

said first buffer means and said second buffer means are located within a single physical memory device.

19. The apparatus providing a decoupling in accordance with claim 17, further comprising means for reducing capacity of at least one of said first buffer means and said second buffer means to zero.

20. The apparatus providing a decoupling in accordance with claim 17, wherein:

said early data is input to a stage of said second pipeline, said stage preceding another stage of said second pipeline to which said late data is input.

21. The apparatus providing a decoupling in accordance with claim 17, wherein:

said late data comprises a branch target address.

* * * * *